United States Patent
Zhang et al.

(10) Patent No.: US 9,469,787 B2
(45) Date of Patent: Oct. 18, 2016

(54) NICKEL PHOSPHOROUS CMP COMPOSITIONS AND METHODS

(71) Applicant: Cabot Microelectronics Corporation, Aurora, IL (US)

(72) Inventors: Ke Zhang, Aurora, IL (US); Selvaraj Palanisamy Chinnathambi, Aurora, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 14/881,837

(22) Filed: Oct. 13, 2015

(65) Prior Publication Data

US 2016/0102227 A1    Apr. 14, 2016

Related U.S. Application Data

(60) Provisional application No. 62/063,502, filed on Oct. 14, 2014.

(51) Int. Cl.
*C09G 1/02* (2006.01)
*B24B 37/11* (2012.01)

(52) U.S. Cl.
CPC *C09G 1/02* (2013.01); *B24B 37/11* (2013.01)

(58) Field of Classification Search
CPC .................. C09G 1/02; B24B 37/11
See application file for complete search history.

(56) References Cited

U.S. PATENT DOCUMENTS

| | | | |
|---|---|---|---|
| 6,303,049 B1* | 10/2001 | Lee ................. | C09G 1/02 252/79.1 |
| 2007/0093182 A1* | 4/2007 | Kollodge ............. | C09G 1/04 451/41 |
| 2007/0093187 A1* | 4/2007 | Takenouchi ........... | C09G 1/02 451/174 |
| 2009/0004863 A1* | 1/2009 | Kamimura .......... | C09G 1/02 438/692 |
| 2009/0215269 A1* | 8/2009 | Boggs ............... | C09G 1/02 438/693 |

* cited by examiner

*Primary Examiner* — Duy Deo
(74) *Attorney, Agent, or Firm* — Thomas Omholt

(57) ABSTRACT

A chemical mechanical polishing (CMP) composition for planarizing a nickel phosphorus (NiP) substrate comprises a suspension of colloidal silica particles and fused silica particles in an acidic aqueous carrier containing hydrogen peroxide, in which the concentration of the fused silica particles is less than or equal to the concentration of the colloidal silica particles. In some embodiments, the CMP composition includes a primary complexing agent, a secondary complexing agent, and a metal ion such as ferric ion, which is capable of reversible oxidation and reduction in the presence of hydrogen peroxide and NiP.

28 Claims, 3 Drawing Sheets

US 9,469,787 B2

NICKEL PHOSPHOROUS CMP COMPOSITIONS AND METHODS

FIELD OF THE INVENTION

This invention relates to chemical mechanical polishing (CMP) compositions and methods. More particularly, this invention relates to CMP methods and compositions for polishing of nickel phosphorus (NiP) surfaces, e.g., for rigid disk applications.

BACKGROUND

Traditional first-step slurries for polishing nickel phosphorus (NiP) surfaces in rigid disk manufacturer typically contain alumina or mixture of alumina and colloidal silica as abrasive. Due to its high hardness, alumina can become embedded or partially embedded in the surface of the NiP substrate during polishing to form a defect. Such a defect may become a surface protrusion upon thermal treatment in subsequent processing steps in rigid disk manufacturing, resulting in a risk of magnetic head crashing when the head travels over the protrusion during the magnetic recording and reading process.

In conventional CMP techniques, a substrate carrier or polishing head is mounted on a carrier assembly and positioned in contact with a polishing pad in a CMP apparatus. The carrier assembly provides a controllable pressure to the substrate, urging the substrate against the polishing pad. The pad and carrier, with its attached substrate, are moved relative to one another. The relative movement of the pad and substrate serves to abrade the surface of the substrate to remove a portion of the material from the substrate surface, thereby polishing the substrate. The polishing of the substrate surface typically is further aided by the chemical activity of the polishing composition (e.g., by oxidizing agents, acids, bases, or other additives present in the CMP composition) and/or the mechanical activity of an abrasive suspended in the polishing composition. Typically, first-step NiP polishing slurries utilize an oxidizing agent such as hydrogen peroxide to aid in removal of NiP.

In order to address and ameliorate the risk of head crash due to embedded alumina, there is a need to develop alumina-free polishing slurries for CMP of NiP. Slurries with colloidal silica alone as abrasive have been explored as one solution. However, in order to improve manufacturing throughput for cost of ownership (CoO) reduction, high removal rate continues to be one of the top requirements for slurries with silica only as abrasive. The compositions and methods described herein address this need by using fused silica as part of the abrasive package.

SUMMARY

Chemical mechanical polishing compositions and methods for planarizing or polishing a nickel phosphorus (NiP) substrate are described herein. In one embodiment, the CMP composition preferably is alumina-free and comprises a particulate abrasive comprising a mixture of colloidal silica and fused silica suspended in an aqueous carrier having an acidic pH (e.g., a pH in the range of about 0 to about 5), and containing a primary oxidizing agent comprising hydrogen peroxide. The colloidal silica typically comprises, e.g., about 1 to about 50 percent by weight (wt %), with a concentration of fused silica that typically is not more than about 100% of the colloidal silica concentration. In some embodiments, the fused silica is present at a concentration in the range of about 0.3 to about 25 wt %. Some embodiments include a secondary oxidizing agent comprising a metal ion capable of reversible oxidation and reduction in the presence of NiP and hydrogen peroxide (e.g., $Fe^{3+}$, $Fe^{2+}$, $Co^{2+}$, $Cu^{2+}$, $Eu^{3+}$, $Mn^{2+}$, $Re^{7+}$, $W^{6+}$, $Mo^{5+}$ and $Ir^{3+}$; preferably $Fe^{3+}$), and optionally one or more materials selected from a primary complexing agent (e.g., glycine) and a secondary complexing agent. The secondary complexing agent (e.g., oxalic acid, citric acid, malonic acid) typically comprises two or three carboxylic acid substituents capable of chelating to the metal ion of the secondary oxidizing agent. Preferably, the abrading is accomplished in conjunction with a polishing pad in a CMP polishing apparatus.

In some embodiments, the components of the composition independently are present, at point of use, at concentrations of about 1 to about 20 wt % for colloidal silica; about 0.3 to about 10 wt % for fused silica, about 1 to about 1000 parts-per-million (ppm) for the metal ion; about 0.3 to about 3 wt % for the primary oxidizing agent; about 0.3 to about 6 wt % for the primary complexing agent; and about 0.001 to about 2 wt % for the secondary complexing agent; with no alumina being present.

The compositions and methods described herein are particularly useful in planarization of NiP substrates for rigid disk applications, and surprisingly provide commercially suitable NiP removal rates without the use of an alumina abrasive.

The following non-limiting embodiments illustrate certain aspects of the CMP compositions and methods described herein.

Embodiment 1 is a chemical mechanical polishing (CMP) composition for planarizing a nickel phosphorus (NiP) substrate, the composition comprising a suspension of about 1 to about 20 wt % of colloidal silica particles and about 0.3 to about 10 wt % of fused silica particles in an acidic aqueous carrier containing a primary oxidizing agent such as hydrogen peroxide; wherein the concentration of the fused silica particles is not more than about 100% of the concentration of the colloidal silica particles; and wherein the composition optionally includes one or more component selected from a metal ion capable of reversible oxidation and reduction in the presence of NiP and hydrogen peroxide; a primary complexing agent, and a secondary complexing agent.

Embodiment 2 comprises the CMP composition of embodiment 1 wherein the primary complexing agent comprises glycine.

Embodiment 3 comprises the CMP composition of embodiment 1 or 2 wherein the primary complexing agent is present in the composition at a concentration in the range of about 0.3 to about 6 wt %.

Embodiment 4 comprises the CMP composition of any one of embodiments 1 to 3 wherein the secondary complexing agent is selected from the group consisting of oxalic acid, citric acid, malonic acid, and a combination of two or more thereof.

Embodiment 5 comprises the CMP composition of any one of embodiments 1 to 4 wherein the secondary complexing agent comprises malonic acid and the metal ion comprises $Fe^{3+}$.

Embodiment 6 comprises the CMP composition of any one of embodiments 1 to 5 wherein the secondary complexing agent is present in the composition at a concentration in the range of about 0.001 to about 2 wt %.

Embodiment 7 comprises the CMP composition of any one of embodiments 1 to 6 wherein the metal ion comprises at least one ion selected from the group consisting of $Fe^{3+}$, $Fe^{2+}$, $Co^{2+}$, $Cu^{2+}$, $Eu^{3+}$, $Mn^{2+}$, $Re^{7+}$, $W^{6+}$, $Mo^{5+}$ and $Ir^{3+}$.

Embodiment 8 comprises the CMP composition of any one of embodiments 1 to 7 wherein the composition has a pH in the range of about 0 to about 5.

Embodiment 9 comprises the CMP composition of any one of embodiments 1 to 8 wherein the colloidal silica is present in the CMP composition at a concentration of about 1 to about 10 wt %.

Embodiment 10 comprises the CMP composition of any one of embodiments 1 to 9 wherein the fused silica is present in the CMP composition at a concentration of about 0.3 to about 6 wt %.

Embodiment 11 comprises the CMP composition of any one of embodiments 1 to 10 wherein the colloidal silica and the fused silica are present in the CMP composition in a weight-to-weight ratio in the range of about 9:1 to about 1:1.

Embodiment 12 comprises the CMP composition of any one of embodiments 1 to 11 wherein the colloidal silica has an average particle size in the range of about 10 to about 300 nm as determined by Brunauer, Emmett and Teller analysis (BET).

Embodiment 13 comprises the CMP composition of any one of embodiments 1 to 12 wherein the fused silica has an average particle size in the range of about 20 to about 3000 nm by BET Embodiment 14 comprises the CMP composition of any one of embodiments 1 to 13 wherein the composition is free from alumina particles.

Embodiment 15 comprises a chemical mechanical polishing (CMP) method for planarizing a nickel phosphorus (NiP) substrate, the method comprising abrading a surface of the substrate with a CMP composition of any one of embodiments 1 to 14; wherein the abrading optionally is accomplished in conjunction with a polishing pad in a CMP polishing apparatus.

DETAILED DESCRIPTION OF EXEMPLARY EMBODIMENTS

Figure 1:
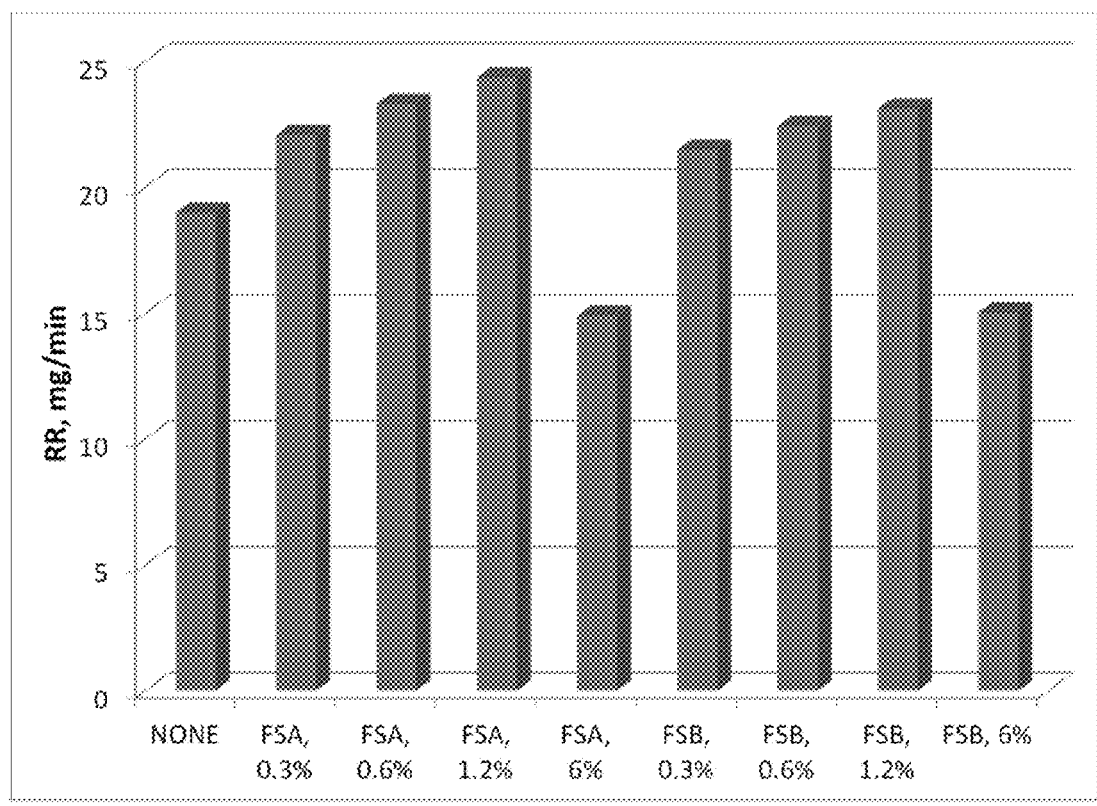
FIG. 1 provides a graph of NiP removal rates (in mg/min) achieved with various CMP compositions described herein.

Chemical mechanical polishing compositions and methods described herein utilize a slurry comprising a particulate abrasive suspended in an acidic aqueous carrier containing hydrogen peroxide. The abrasive is a blend of colloidal silica (the major component) and fused silica (the minor component) and typically is free from alumina particles. In many embodiments the composition also includes one or more of a secondary oxidizing agent comprising a metal ion capable of reversible oxidation and reduction in the presence of NiP and hydrogen peroxide, a primary complexing agent, and a secondary complexing agent.

The primary complexing agent is an amino acid or carboxylic acid such as glycine alanine, aspartic acid, histidine, nitriloacetic acid, iminodiacetic acid, N-(hydroxyethyl)-ethylenediaminetriacetic acid, acetic acid, tartaric acid, citric acid, oxalic acid, lactic acid, glutaric acid, maleic acid, gluconic acid, malonic acid and glycolic acid. Without being bound by theory, it is believed that the primary complexing agent, such as glycine, in the polishing slurry aids in Ni removal by complexing with nickel ions formed during the polishing process. Typically, the primary complexing agent is present in the composition at a concentration of about 0.3 to about 6 wt %, e.g., about 0.3 to about 1 wt %, at point of use.

The secondary complexing agent comprises a material with two or three carboxylic acid substituents capable of chelating to the metal ion of the secondary oxidizing agent. Non-limiting examples of suitable secondary complexing agents include oxalic acid, malonic acid, succinic acid, malic acid, tartaric acid, citric acid, glutaric acid, adipic acid, maleic acid, phthalic acid and iminodiacetic acid. In some embodiments, the secondary complexing agent is selected from oxalic acid, citric acid, malonic acid, and a combination of two or more thereof. Typically, the secondary complexing agent is present at a concentration of about 0.001 to about 2 wt % at point of use, for example about 0.03 to about 0.4 wt %, or about 0.04 to about 0.2 wt %. In some embodiments, the secondary complexing agent is present at a molar concentration of two or more times the molar concentration of the secondary oxidizing agent metal ion (e.g., about 2 to about 20 times the metal ion molar concentration, or about 2 to 10 times the metal ion molar concentration).

The terms "carboxylic acid" and "acid" as used herein in reference to secondary complexing agents are meant to encompass the free acid form as well as salts (e.g., alkali metal salts) and zwitterionic forms.

The secondary oxidizing agent comprises a metal ion that is capable of reversible oxidation and reduction in the presence of NiP and hydrogen peroxide. Non-limiting examples of such metal ions include $Fe^{3+}$, $Fe^{2+}$, $Co^{2+}$, $Cu^{2+}$, $Eu^{3+}$, $Mn^{2+}$, $Re^{7+}$, $W^{6+}$, $Mo^{5+}$ and $Ir^{3+}$. Preferably, the metal ion is or comprises $Fe^{3+}$. Typically, the metal ion is included in the CMP composition as a soluble salt, e.g., a nitrate, a halide (e.g., chloride), a sulfate, and the like. Optionally, the metal ion can be included in the slurry as a salt with the complexing agent, e.g., a malonic acid salt, citric acid salt, and the like. Typically, the metal ion is present in the composition (at point of use) at a concentration of about 1 to about 1000 ppm, for example about 20 to about 250 ppm, or about 50 to about 150 ppm.

The primary oxidizing agent comprises, consists essentially of, or consists of hydrogen peroxide, optionally in combination with another peroxy-based oxidizer such as a peroxymonosulfate or peroxydisulfate salt. Typically, the CMP composition comprises, at point of use, about 0.1 to about 4 wt %, e.g., about 0.3 to about 1.8 wt % of the primary oxidizing agent (e.g., hydrogen peroxide), which preferably is added shortly before use in a polishing process, e.g., a few minutes (e.g., 1 to 60 minutes) to a few hours (e.g., 1 to 12 hours) prior to use.

The particulate abrasive comprises a combination of colloidal silica particles and fused silica particles. Preferred embodiments are free from alumina abrasive particles. A typical particulate abrasive comprises, consists essentially of or consists of colloidal silica and fused silica, in which the fused silica is present at a concentration that is about 11 to about 100 percent of the colloidal silica concentration. For example, the colloidal silica and fused silica can be present in a weight-to-weight ratio of about 9:1 to about 1:1. In other words, the fused silica may be present in an amount relative to the colloidal silica, of about 11% to about 100%. In a preferred embodiment, the concentration of the fused silica particles is not more than about 100% of the concentration of the colloidal silica particles. For example the concentration of the fused silica particles is about 11%, about 25%, about 50%, about 75% or about 100% of the concentration of the colloidal silica particles.

Colloidal silica having any suitable average particle size may be used. Typically, the colloidal silica particles have an average particle size of about 10 to about 300 nm, e.g., 20 to about 50 nm as determined by BET.

Fused silica having any suitable average particle size may be used. The fused silica particles typically have an average particle size of about 20 to about 3000 nm, e.g., about 34 to about 440 nm as determined by BET.

Fused silica is a distinctly different material than colloidal silica or fumed silica, and has, for example, different chemical and physical properties compared to colloidal silica and fumed silica, including different polishing characteristics. Colloidal silica is manufactured in solution, typically by aqueous hydrolysis of silicate esters. The hydrolysis conditions result in distinct particle size distributions and particle morphology (typically spherical or spheroidal particles). Fumed silica is produced by pyrolysis of a precursor such as a silicon tetrachloride, and condensation from the gas phase. Fumed silica consists of nanometer to micron-sized particle of amorphous silica having branched, chain-like, three-dimensional secondary particles which then agglomerate into tertiary particles, and has low bulk density and high surface area. In contrast, fused silica is a glass that is produced by at high temperatures from e.g., silicon, by oxidation and fusion, typically followed by comminution and/or sieving to produce a fine powder. Fused silica, like fumed silica, has a substantially fully condensed surface (i.e., little or no SiOH groups) compared to colloidal silica, which has a substantial amount of hydroxyl functionality on the particles surface; however, the particle morphology of fused silica is more like colloidal silica (typically spherical or spheroidal particles) rather than fused silica particles (typically aggregated particles). In addition, fused silica has a higher true density than either colloidal silica or fumed silica. The isoelectric point of fused silica is around zero.

The compositions of the present invention have an acidic pH. For example, the compositions of the present invention have a pH of less than or equal to about 5. Preferably, the compositions of the present invention have a pH of about 1 to about 5, i.e., about 2 to about 4, about 1 to about 3, about 1 to about 2. The pH of the composition can be achieved and/or maintained by inclusion of an acidic buffering material if desired. Acidic buffers are well known to those of ordinary skill in the chemical arts.

The polishing compositions described herein optionally also can include suitable amounts of one or more other additive materials commonly included in polishing compositions, such as dispersants, viscosity modifying agents, biocides, nonionic surfactants, and the like. For example, the composition can include a biocide such as KATHON or NEOLONE biocides. In some preferred embodiments, the CMP composition is free from viscosity modifying agents such as carboxymethylcellulose, and the like.

The aqueous carrier can be any aqueous solvent, e.g., water, aqueous methanol, aqueous ethanol, a combination thereof, and the like. Preferably, the aqueous carrier comprises predominately deionized water.

The polishing compositions used in the methods described herein can be prepared by any suitable technique, many of which are known to those skilled in the art. The polishing composition can be prepared in a batch or continuous process. Generally, the polishing composition can be prepared by combining the components thereof in any order.

The term "component" as used herein includes individual ingredients (e.g., abrasive, complexing agents, secondary oxidizing agent, buffers, primary oxidizing agent, and the like), as well as any combination of ingredients. For example, the abrasive can be dispersed in water, combined with the other components, and mixed by any method that is capable of incorporating the components into the polishing composition. Typically, the primary oxidizing agent is not added to the CMP composition until the composition is ready for use in a CMP process, for example, the oxidizing agent can be added shortly before initiation of polishing. The pH can be further adjusted at any suitable time by addition of an acid or base, as needed.

The polishing compositions of the present invention also can be provided as a concentrate, which is intended to be diluted with an appropriate amount of aqueous solvent (e.g., water) prior to use. In such an embodiment, the polishing composition concentrate can include the various components dispersed or dissolved in aqueous solvent in amounts such that, upon dilution of the concentrate with an appropriate amount of aqueous solvent, each component of the polishing composition will be present in the polishing composition in an amount within the appropriate range for use.

The compositions and methods of the invention surprisingly provide commercially suitable removal rates when polishing a NiP surface without the use of alumina abrasives. Consequently, surface inclusion defects in the polished NiP surface typically are reduced relative to surfaces prepared using alumina.

The CMP methods of the invention preferably are achieved using a chemical-mechanical polishing apparatus. Typically, the CMP apparatus comprises a platen, which, when in use, is in motion and has a velocity that results from orbital, linear, and/or circular motion, a polishing pad in contact with the platen and moving relative to the platen when in motion, and a carrier that holds a substrate to be polished by contacting and moving relative to the surface of the polishing pad. The polishing of the substrate takes place by the substrate being placed in contact with the polishing pad and a polishing composition of the invention and then moving the polishing pad relative to the substrate, so as to abrade at least a portion of the substrate to polish the substrate.

The following examples further illustrate certain aspects of the invention but, of course, should not be construed as in any way limiting its scope. As used herein and in the following examples and claims, concentrations reported as parts-per-million (ppm) or percent by weight (wt %) are based on the weight of the active component of interest divided by the weight of the composition. Unless otherwise specified, particle surface area and average (or mean) particles size of abrasive materials are on the basis of Brunauer, Emmett and Teller (BET) analysis, which is well known in the particles analysis arts and is described, e.g., in Particle and Surface Characterization Methods, R. H. Müller and W. Mehnert, Eds., Medpharm Scientific Publishers, Stuttgart, Germany (1997), pp. 185-197, Chapter 11, entitled "Surface area analysis of finely divided and porous solids by gas adsorption measurements", by T. Schoofs, which is incorporated herein by reference in its entirety.

EXAMPLE 1

This example compares the true density of fused silica to colloidal silica and fumed silica. Samples of fumed (Aerosil Ox50, Evonik Corporation, Parsippany, N.J.), fused (SFP-30M Denka, Tokyo JP) and colloidal silica (Snowtex CZL, Nissan Chemical, Houston, Tex.) were analyzed for their calculated true density using a DE40 density meter (Mettler Toledo, Columbus, Ohio). For the fumed and the fused silica samples, the samples were prepared by mixing the dry powder in deionized water. For colloidal silica, the sample was prepared by deionized water dilution of a commercially available colloidal silica suspension, consisting of approximately a 40% SiO2 content. Solid content of the silica dispersions was measured by pre- and post-drying mass measurements. The true density of the particles was calculated from equation 1:

True density=$S/((1/Ds-(1-S)/Dw))$ (Equation 1)

Wherein, S: solid content of silica dispersion, Ds: density of silica dispersion and Dw: density of water (1 g/cm3 at 4° C.).

TABLE 1

| | QC analysis | | density of water (g/cm³) | calc. true density of SiO₂ (g/cm³) |
|---|---|---|---|---|
| | solid content | density (lbs/gal) | | |
| Fumed (Aerosil Ox50) | 22.02% | 9.4474 | 1 | 2.153 |
| Fused (SFP-30M) | 21.93% | 9.4699 | 1 | 2.209 |
| Colloidal (Snowtex CZL) | 16.84% | 9.167 | 1 | 2.174 |

Table 1 shows that the fused silica particle has higher true density than both fumed and colloidal silica particle. This indicates that the fused silica particle might have higher hardness than fumed and colloidal silica particles due to a denser structure. The true density for colloidal silica should be lower than the calculated true value, because the analyzed solid content includes salts involved in the colloidal silica manufacturing process.

EXAMPLE 2

All NiP disks were polished using a 6EE DOUBLE SURFACE POLISHMETER (from Strasbaugh, San Jose, Calif.). Twenty five (25) disks were polished in each run at a slurry flow rate of about 400 mL/min with a CF-18 polishing pad (from Fujibo), at a down force of about 130 kg, an upper platen speed of about 23 revolutions-per-minute (rpm), a lower platen speed of about 28 rpm, and a carrier speed of about 5 rpm. Weight measurements were made on five disks to determine the material removal rates (RR in mg/min). The slurries comprised (a) colloidal silica (about 80 m²/g surface area, about 34 nm average particle size by Brunauer, Emmett and Teller (BET) analysis) in varying concentrations; (b) fused silica in varying concentrations and mean particle size/surface area; (c) hydrogen peroxide (about 1.2 wt %); (d) secondary oxidizing metal ion (about 0.0724 wt % of ferric nitrate nonahydrate); (e) glycine (about 0.5 wt %); and (f) malonic acid (about 0.093 wt %) at a pH of about 1.3. Table 2 provides the concentrations of the colloidal and fused silica, the type of fused silica used, and the NiP removal rates (RR, mg/min) that were observed.

TABLE 2

| Run # | Example # | Colloidal Silica wt % | Fused Silica Type and wt % | NiP RR mg/min |
|---|---|---|---|---|
| 1 | 1A | 6 | NONE | 18.99 |
| 1 | 1B | 5.7 | FSA, 0.3% | 22.07 |
| 1 | 1C | 5.4 | FSA, 0.6% | 23.3 |
| 1 | 1D | 4.8 | FSA, 1.2% | 24.35 |
| 1 | 1E | 0 | FSA, 6% | 14.88 |
| 1 | 1F | 5.7 | FSB, 0.3% | 21.47 |
| 1 | 1G | 5.4 | FSB, 0.6% | 22.42 |
| 1 | 1H | 4.8 | FSB, 1.2% | 23.11 |
| 1 | 1I | 0 | FSB, 6% | 15.03 |
| 2 | 2A | 6 | NONE | 15.82 |
| 2 | 2B | 4.8 | FSA, 1.2% | 20.45 |
| 2 | 2C | 5.7 | FSC, 0.3% | 17.56 |
| 2 | 2D | 5.4 | FSC, 0.6% | 18.94 |
| 2 | 2E | 4.8 | FSC, 1.2% | 18.77 |
| 2 | 2F | 0 | FSC, 6% | 17.24 |
| 2 | 2G | 5.7 | FSD, 0.3% | 18.24 |
| 2 | 2H | 5.4 | FSD, 0.6% | 18.46 |
| 2 | 2I | 4.8 | FSD, 1.2% | 18.23 |
| 2 | 2J | 0 | FSD, 6% | 13.57 |

In Table 2, FSA is a fused silica having an average particle size of about 440 nm and a surface area of about 6.2 m²/g by BET; FSB is a fused silica having an average particle size of about 241 nm and a surface area of about 11.3 m²/g by BET; FSC is a fused silica having an average particle size of about 91 nm and a surface area of about 30 m²/g by BET; and FSD is a fused silica having an average particle size of about 34 nm and a surface area of about 80 m²/g by BET.

Figure 2:
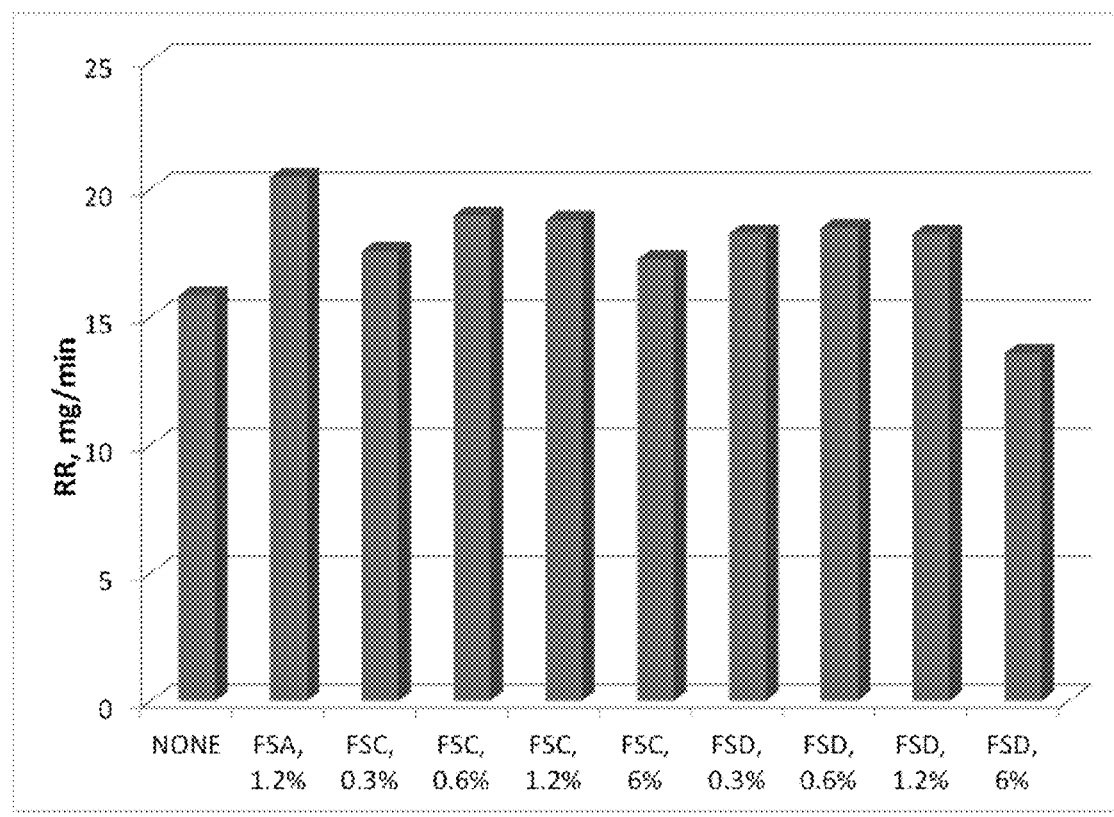
FIG. 2 provides a graph of NiP removal rates (in mg/min) achieved with various other CMP compositions described herein.

The results in Table 2 show that addition of fused silica to the colloidal silica resulted in increased removal rates (RR) compared to colloidal silica or fused silica alone. FIG. 1 provides a graph of RR for the various compositions in Run 1 of Table 2. FIG. 2 provides a graph of RR for the various compositions in Run 2 of Table 2.

EXAMPLE 3

This example illustrates the differences in wettable surface determination between colloidal silica and fused silica.

Figure 3:
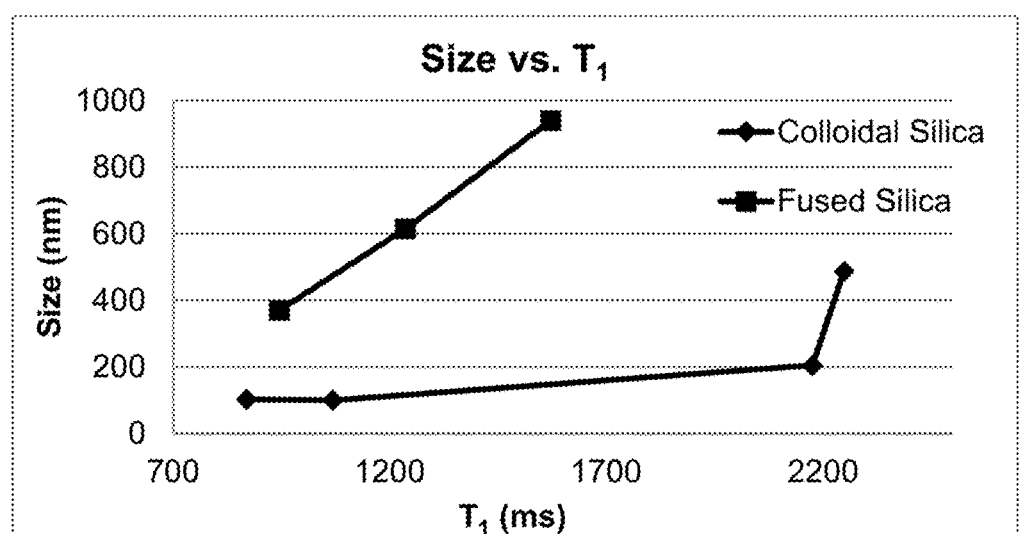
FIG. 3 provides a graph of average particle size (nm) vs. T1 (ms) for colloidal silica and fused silica particles.

T1 relaxation times were measured with an Acorn Area NMR Spectrometer (XiGo NanoTools, Bethlehem, Pa.) with various colloidal silica and fused silica samples. Commercially available samples of colloidal and fused silica were measured at 20% by weight particle loading in deionized water at approximately pH 9.8. The samples of colloidal silica and fused silica were chosen because they were representative of spherical colloidal and fused silica at various sizes. The T1 relaxation time (Table 1) measurement is related to the change in interaction of the silica particle with water at its interface vs. bulk water. In general, as particle size decreases so does T1. A decrease in T1 indicates an increased wettable surface. Therefore, the lower the T1 value, the more water interacts with the particle at the surface-particle interface. As highlighted in Table 3 and FIG. 3, fused silica has a naturally higher wettable surface than that of colloidal silica when compared to particles of similar sizes.

TABLE 3

| Particle (20 wt. %) | $T_1$ (ms) | Ave. Size (nm) |
|---|---|---|
| MP4540M (Colloidal) | 2247.5 | 487 |
| Snowtex CZL (Colloidal) | 2175 | 205 |
| Bindzil SP599L (Colloidal) | 1067.7 | 100 |
| Bindzil 50/80 (Colloidal) | 869.5 | 103 |
| SFP-30M (Fused) | 1570.5 | 940 |

TABLE 3-continued

| Particle (20 wt. %) | T₁ (ms) | Ave. Size (nm) |
|---|---|---|
| SFP-20M (Fused) | 1235.5 | 615 |
| UFP-30 (Fused) | 944.5 | 370 |

*Bindzil SP599L and Bindzil 50/80 commercially available from Akzo Nobel Inc. (Amsterdam, Netherlands); SFP-30M, SFP-20M and UFP-30 commercially available from Denka (Tokyo, JP); Snowtex CZL and MP4540M commercially available from Nissan Chemicals (Houston, TX).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A chemical mechanical polishing (CMP) composition for planarizing a nickel phosphorus (NiP) substrate, the composition comprising a suspension of about 1 to about 20 percent by weight (wt %) of colloidal silica particles and about 0.3 to about 10 wt % of fused silica particles in an acidic aqueous carrier comprising a primary oxidizing agent that includes hydrogen peroxide; wherein the concentration of the fused silica particles is not more than about 100% of the concentration of the colloidal silica particles.

2. The CMP composition of claim 1 further comprising a secondary oxidizing agent comprising a metal ion capable of reversible oxidation and reduction in the presence of NiP and hydrogen peroxide.

3. The CMP composition of claim 2 further comprising a primary complexing agent.

4. The CMP composition of claim 3 wherein the primary complexing agent comprises glycine.

5. The CMP composition of claim 3 wherein the primary complexing agent is present in the composition at a concentration in the range of about 0.3 to about 6 wt %.

6. The CMP composition of claim 3 further comprising a secondary complexing agent.

7. The CMP composition of claim 6 wherein the secondary complexing agent is selected from the group consisting of oxalic acid, citric acid, malonic acid, and a combination of two or more thereof.

8. The CMP composition of claim 6 wherein the secondary complexing agent comprises malonic acid.

9. The CMP composition of claim 6 wherein the secondary complexing agent comprises malonic acid and the metal ion comprises $Fe^{3+}$.

10. The CMP composition of claim 6 wherein the secondary complexing agent is present in the composition at a concentration in the range of about 0.04 to about 2 wt %.

11. The CMP composition of claim 2 wherein the metal ion comprises at least one ion selected from the group consisting of $Fe^{3+}$, $Fe^{2+}$, $Co^{2+}$, $Cu^{2+}$, $Eu^{3+}$, $Mn^{2+}$, $Re^{7+}$, $W^{6+}$, $Mo^{5+}$ and $Ir^{3+}$.

12. The CMP composition of claim 2 wherein the metal ion comprises $Fe^{3+}$.

13. The CMP composition of claim 1 wherein the composition has a pH in the range of about 0 to about 5.

14. The CMP composition of claim 1 wherein the colloidal silica is present in the CMP composition at a concentration of about 1 to about 10 wt %.

15. The CMP composition of claim 1 wherein the fused silica is present in the CMP composition at a concentration of about 0.3 to about 6 wt %.

16. The CMP composition of claim 1 wherein the colloidal silica and the fused silica are present in the CMP composition in a weight-to-weight ratio in the range of about 9:1 to about 1:1.

17. The CMP composition of claim 1 wherein the colloidal silica has an average particle size in the range of about 10 to about 300 nm.

18. The CMP composition of claim 1 wherein the fused silica has an average particle size in the range of about 20 to about 3000 nm.

19. The CMP composition of claim 1 wherein the composition is free from alumina particles.

20. A chemical mechanical polishing (CMP) composition for planarizing a nickel phosphorus (NiP) substrate, the composition comprising a suspension of about 1 to about 10 wt % colloidal silica particles and about 0.3 to about 6 wt % fused silica particles in an acidic aqueous carrier containing about 0.3 to about 1.8 wt % hydrogen peroxide; about 50 to about 150 ppm of a metal ion selected from the group consisting of $Fe^{3+}$, $Fe^{2+}$, $Co^{2+}$, $Cu^{2+}$, $Eu^{3+}$, $Mn^{2+}$, $Re^{7+}$, $W^{6+}$, $Mo^{5+}$ and $Ir^{3+}$; about 0.3 to about 6 wt % of a primary complexing agent; and about 0.4 to about 2 wt % of a secondary complexing agent; wherein the fused silica particles are present in at a concentration that is not more than about 100% of the concentration of the colloidal silica particles.

21. The CMP composition of claim 20 wherein the metal ion comprises $Fe^{3+}$.

22. The CMP composition of claim 20 wherein the primary complexing agent comprises glycine.

23. The CMP composition of claim 20 wherein the secondary complexing agent is selected from the group consisting of oxalic acid, citric acid, malonic acid, and a combination of two or more thereof.

24. The CMP composition of claim 20 wherein the metal ion comprises $Fe^{3+}$, the primary complexing agent comprises glycine and the secondary complexing agent comprises malonic acid.

25. The CMP composition of claim 20 wherein the colloidal silica has an average particle size in the range of about 10 to about 300 nm.

26. The CMP composition of claim 20 wherein the fused silica has an average particle size in the range of about 20 to about 3000 nm.

27. A chemical mechanical polishing method for planarizing a NiP substrate, the method comprising abrading a surface of the substrate with a CMP composition of claim 1.

28. A chemical mechanical polishing method for planarizing a NiP substrate, the method comprising abrading a surface of the substrate with a CMP composition of claim 20.

* * * * *